T. MIDGLEY.
TIRE MOLD.
APPLICATION FILED OCT. 24, 1918.
1,368,641.  Patented Feb. 15, 1921.
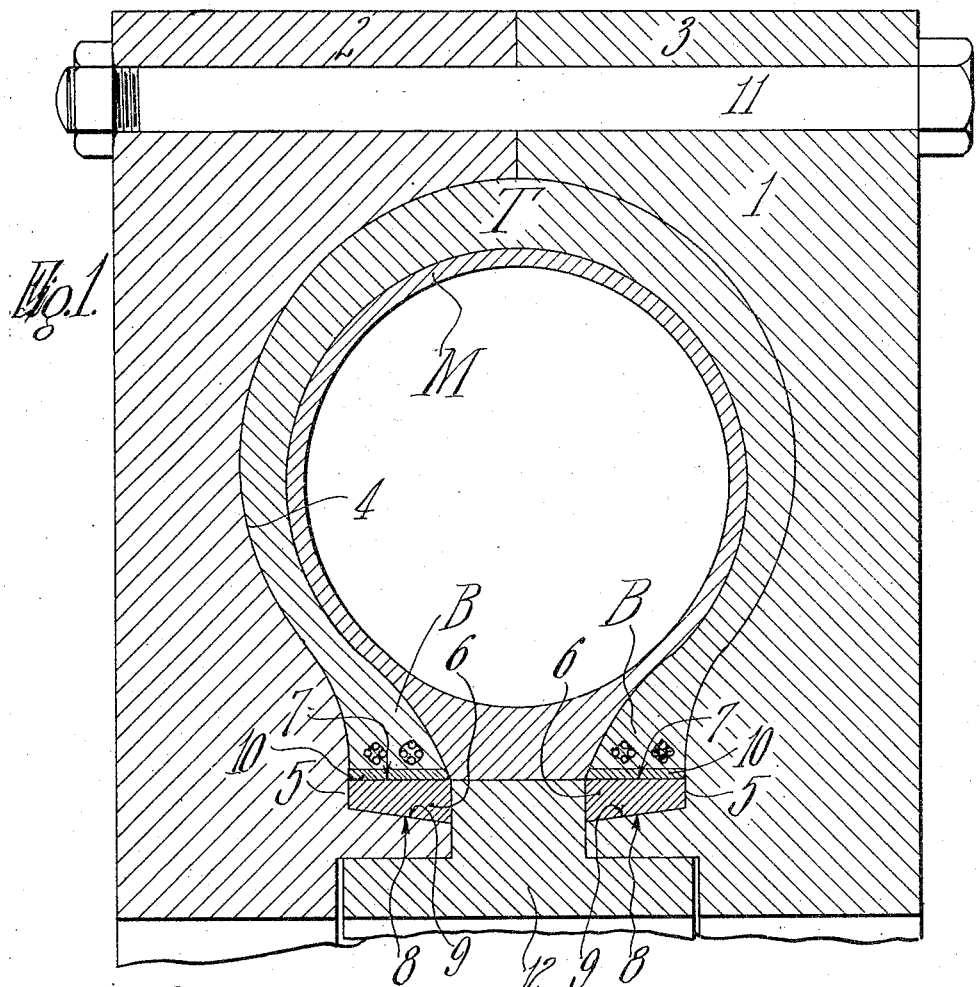
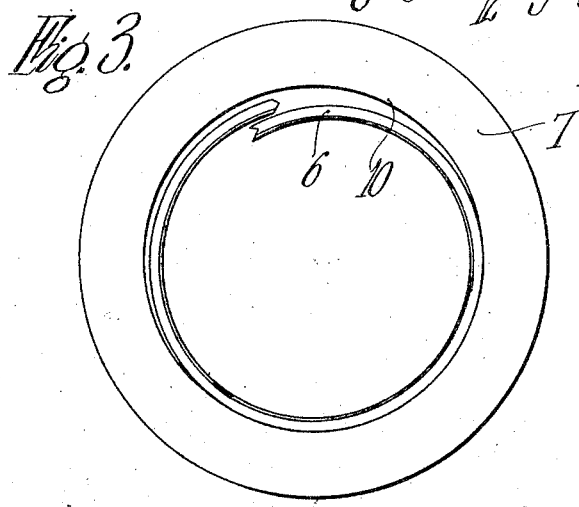
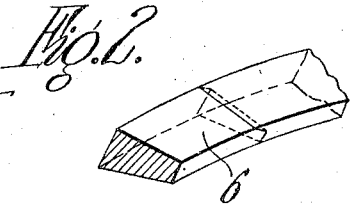
INVENTOR.
Thomas Midgley.
BY
ATTORNEYS.

UNITED STATES PATENT OFFICE.

THOMAS MIDGLEY, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

TIRE-MOLD.

1,368,641.      Specification of Letters Patent.      Patented Feb. 15, 1921.

Application filed October 24, 1918. Serial No. 259,498.

*To all whom it may concern:*

Be it known that I, THOMAS MIDGLEY, a citizen of the United States of America, residing at Springfield, in the county of Hampden and State of Massachusetts, have invented certain new and useful Improvements in Tire-Molds, of which the following is a specification.

My invention relates to molds and more particularly to a tire mold.

In the building of rubber tires it is the common practice to build up the tire casing, or "tire", on an annular core or mandrel from layers of fabric and rubber, and when the tire has been built up to insert it in a mold and vulcanize it, the tire being suitably supported interiorly, as upon the core upon which it was built up. The tires have a base at each side of them to aid in fastening them on the wheel rim and it is common to place endless bead wires of fixed diameter in these bases. Now, it is desirable to place layers of fabric beneath the bead wires, *i. e.*, radially below them. But if a sufficiently few layers of this fabric are used to permit the easy insertion of the tire in the mold, such a number is insufficient to give a proper base, while if sufficient layers to give a proper base are used then this number of layers must, to insert it in the mold, be forced or compressed radially outwardly, since it is, before compression, considerably thicker through, radially, than the space feasible to provide in the mold to accommodate it. Again, compression of the fabric radially one layer against the next is highly desirable in itself. Because of this need for compression, it is no small difficulty to get a tire with a proper number of layers into the mold, for the fabric has to be pressed down and jammed into place as best the workman can. It can well be understood that the jamming of the fabric into place is many times most unsatisfactorily done, with the result that the tire comes out of the mold with imperfect bottoms to its bases and has to be sold as a "second".

It has, I am aware, been previously proposed to use a mold with rings of fixed diameter, designed to be placed on clencher tire beads and then slid sidewise in the mold proper to compress the beads sidewise. But these rings, since they slid sidewise, served merely to compress the beads sidewise, serving, perhaps, to compact them sidewise but, not for any practical purpose, serving to compress the layers of the bead, one against the other radially, thereby to give a practically unitary bead structure. Moreover, these rings were of receptacle-form, so that, just as in a simple mold, there was the great difficulty of having to pack, jam and compress a bead into the receptacles or else have insufficient layers at the bottom of the bead. Briefly, there were no provisions made for putting as many base layers on as desired, readily compressing them radially, and then slipping the tire into the mold.

Now, I have devised a mold which, while permitting the use of the large and desirable number of layers, and the desirable radial compression, obviates this trouble of difficult and unsatisfactory insertion into the mold or into receptacle-form rings, to which I have called attention. The use of this mold enables tires with perfectly molded bases to be produced unfailingly and with none of the difficulty above referred to.

One object of my invention is to provide a tire mold enabling the production of tires with perfectly molded bases.

Another object is to provide a mold into which a tire, having bases oversize before insertion in the mold, can be inserted easily, properly, and expeditiously by inexpert labor.

Another object is to provide a mold into which a tire, having a desirable number of layers of material at the bottoms of its bases, can be easily and accurately inserted, and the material properly compressed.

To these ends, and also to improve generally upon devices of the character indicated, my invention consists in the following matters hereinafter described and claimed.

In the accompanying drawings:

Figure 1 is a radial cross-section of a mold embodying my invention;

Fig. 2 is a fragmental view of the mating ends of one of the compressor rings of the illustrated mold; and Fig. 3 is a side elevation of a tire or casing with one of the compressor rings sprung out of shape and just being placed on the tire base.

Without restricting my invention thereto, I describe it by reference to the illustrated mold embodying it.

The preferably metallic mold, indicated generally by the character 1, comprises two separable matched and like annular halves 2 and 3, providing, when assembled, the annular space 4 for receiving the tire T to be vulcanized. A core or mandrel M, within the tire, exemplifies means for carrying and supporting the tire. Each mold-half is provided, just below (radially) the position which the base B of the tire occupies, with an annular recess 5. A preferably metallic spring ring 6 continuous throughout its length except, preferably, for a single cutting thereacross, is receivable in each recess 5. The top, or radially outer, face 7 of such ring is contoured to properly shape the bottom of the base, being flat in the present instance. The lower, or radially inner, face 8 of such ring is so contoured, and the corresponding face 9 of the recess 5 is so correspondingly contoured, that the rings 6 will readily slide into place and properly center, thus to properly locate the tire in the mold. As here illustrated, the faces 8 and 9 are shown as inclined planes sloping downward in the direction of approach of the mold-halves and forming a species of coöperating centering-cones.

The compressor rings 6 are separable from the mold proper in order that they can be bodily removed therefrom and applied to the tire before its introduction to the mold proper, as indicated in Fig. 3. Because of the spring character of each ring, it can be deformed, as into the position indicated in Fig. 3, and fitted to the bottom of the base. Now the ring is of such dimensions that when it is in its normal condition, i. e. its condition when its ends are closely mated as indicated in Fig. 2, its diameter corresponds to the diameter of the base after the proper compression of the desirable number of layers of fabric 10, and gives a base of standard diameter. The act of placing the ring in position performs the desired compression of the layers. And the normal inside diameter of the ring is such as to adapt it to slide readily into the mold proper. Desirably, the natural unsprung diameter of the ring is slightly less than the diameter of the ring when its ends are mated, whereby the ring, when its ends have been mated, remains self-locked at the desired base-diameter. The expansion-pressure of the compressed fabric holds the ring to the tire and the ring holds the fabric compressed to the desired amount and diameter.

When the rings have been applied to the bases (Fig. 3) and the ends of each ring brought into alinement, (Fig. 2) the tire, on the core and with the rings on the tire, is placed in the mold proper. And this operation is performed without difficulty, since the bases are already compressed and the rings are of the right diameter to fit accurately into the mold proper. It will be noted, too, that the rings, applied and dimensioned as described, give the bases a fixed and accurately determined diameter.

Should there be any sticking of the rings upon their introduction into the mold proper, then, when the mold-halves are forced together by external pressure, as by bolts 11, as shown in Fig. 1, any tendency of the rings to stick and so shift sidewise with the mold-halves instead of sliding into place is desirably resisted by a suitable abutment, as the mold's annular T-ring 12. It will be understood that this action is not designed to be sufficiently severe to expand the rings—the ends of the rings remain closely fitted together thereby to obviate the formation of a ridge or the like on the bottom of the bead, such as might be formed did the ends separate.

With the illustrated structure: the fabric elements 10, of the desired large number of layers, can be fitted accurately, evenly, quickly, and without creases or wrinkles against the parts of the mold which they contact, i. e. the rings 6 and, so, into the mold proper. When the compacting pressure is applied to the fabric, it is applied evenly, uniformly, and accurately to the bottoms of the fabric and is exerted directly, uniformly, and radially outward in the ideal manner. When the tire is removed from the mold the tire comes away from the mold proper easily, since, should there be any sticking of the bases, it will be to the compressor rings and, the rings coming out with the tire, they can then be easily removed from the bases by deforming the rings.

Desirably, and as illustrated more particularly in Fig. 2, I form the matching ends of each ring 6 V-shaped in order to insure one end acting as a catch for the other, keeping the ends in alinement.

It will be seen that I have provided a mold providing for the ready and accurate insertion of tires having the desired large number of fabric layers at the bottom of their bases and with said bases oversize prior to the insertion of the tire in the mold; providing for the accurate compression of the said oversize bases, particularly by pressure applied directly to the faces of the bottoms, and providing, generally, for the inexpensive and ready production of standard diameter tires having a relatively large number of layers of compressed fabric at the bottoms of their bases.

What I claim is,—

1. In a tire mold, a pair of mated annular sections together presenting a cavity to receive a tire, said cavity extending slightly beyond the base of the tire, and affording space under the base for the reception of a compressor ring, an annular flange forming part of each mold section and extending under the base of the tire so as to contact with the internal circumference of the compressor ring, and a compressor ring adapted to be expanded to compress the base of the tire and to lie snugly in the space between the said base and the walls of said cavity.

2. In a tire mold, a pair of mated annular sections together presenting a cavity to receive a tire, said cavity extending slightly beyond the bases of the tire, and affording space under each base for the reception of a compressor ring, an annular flange forming part of each mold section and extending under the base of the tire so as to contact with the internal circumference of the compressor ring, and a pair of split compressor rings adapted to be expanded to compress the bases of the tire and being each constructed to maintain itself in its expanded condition by the interlocking of its split ends, said compressor rings lying in the spaces between the said bases and the walls of said cavity.

THOMAS MIDGLEY.